(No Model.) 2 Sheets—Sheet 1.
T. B. BAKER.
PICTURE FRAME CLAMP.

No. 500,364. Patented June 27, 1893.

Witnesses.
Laura Shaeffer
V. L. Ney

Inventor.
Thomas B. Baker
By Fred W. Bond
Attorney (No Model.) 2 Sheets—Sheet 2.
T. B. BAKER.
PICTURE FRAME CLAMP.
No. 500,364. Patented June 27, 1893.
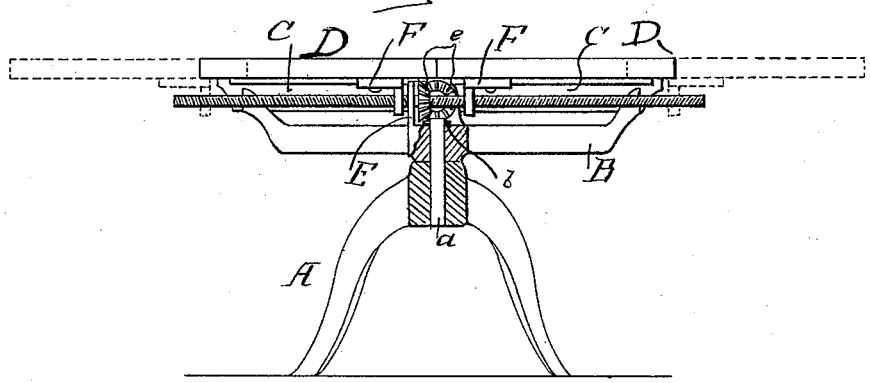
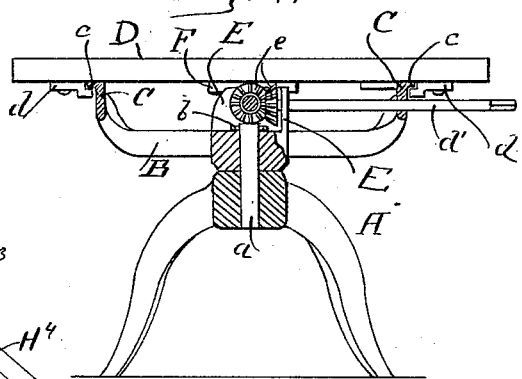
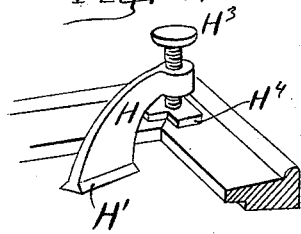
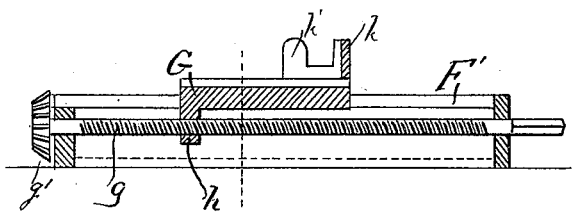
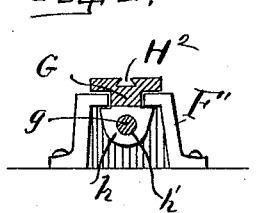 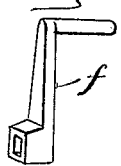
Witnesses.
Laura Shaeffer
V. L. Ney
Inventor:
Thomas B. Baker
By Fred W. Bond
Attorney.

UNITED STATES PATENT OFFICE.

THOMAS B. BAKER, OF CANTON, OHIO.

PICTURE-FRAME CLAMP.

SPECIFICATION forming part of Letters Patent No. 500,364, dated June 27, 1893.

Application filed July 11, 1892. Serial No. 439,687. (No model.)

*To all whom it may concern:*

Be it known that I, THOMAS B. BAKER, a citizen of the United States, residing at Canton, in the county of Stark and State of Ohio, have invented certain new and useful Improvements in Picture-Frame Clamps; and I do hereby declare that the following is a full, clear, and exact description of the same, reference being had to the annexed drawings, making a part of this specification, and to the letters of reference marked thereon, in which—

Figure 1:
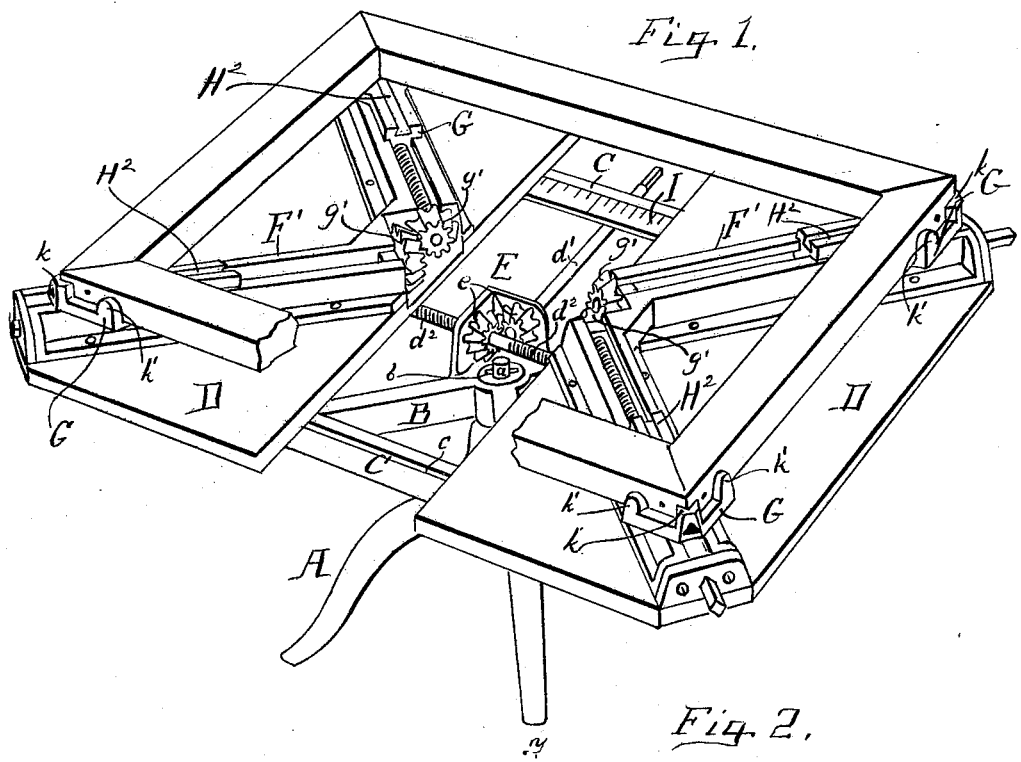
Figure 2:
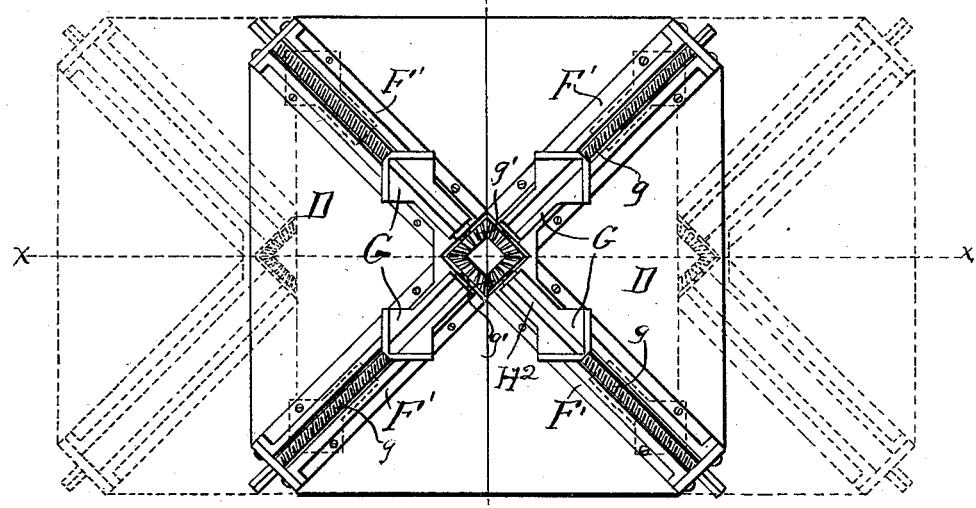

Figure 1, is an isometrical view showing the frame properly clamped, and illustrating the position of the different parts of the device. Fig. 2, is a top view showing the corner blocks or heads brought to a common center, and illustrating the position of the different parts when placed in proper position to receive a frame in dotted lines. Fig. 3, is a view on line $x$—$x$, Fig. 2, showing parts removed. Fig. 4, is a view on line $y$—$y$, Fig. 2, showing parts removed. Fig. 5, is a longitudinal section of one of the tracks or ways, showing its screw threaded shaft properly located, and illustrating the position of the sliding block or head. Fig. 6, is a transverse section of one of the tracks or ways illustrating the position of one of the corner blocks or heads. Fig. 7, is a detached view of the crank for rotating the different screw threaded shafts. Fig. 8, is a detached view of the clamp designed and calculated to spring the frame into proper alignment.

The present invention has relation to picture frame clamps and it consists in the different parts and combination of parts hereinafter described and particularly pointed out in the claims.

Similar letters of reference indicate corresponding parts in all the figures of the drawings.

In the acccompanying drawings A, represents the base or stand which is designed and calculated to support and hold the clamp proper as hereinafter described. To the top or upper part of the base or stand A, is pivotally attached the frame B, by means of the pin $a$, which pin is preferably attached to the base A; and the revolving frame B, is securely held in proper position by means of the cross pin $b$; the cross pin $b$, being located substantially as illustrated in Figs. 1, 3, and 4. The revolving frame B, is provided with two parallel bars C, which parallel bars may be formed integral with the revolving frame B; or they may be separate and attached to said revolving frame in any convenient and well known manner. The parallel-bars C, are each provided with the flange $c$, thereby providing two flanges which are for the purpose of receiving the flanged strips $d$, said flanged strips being for the purpose of forming guides for the table sections D, and to which table sections the guide strips $d$, are securely attached in any convenient and well known manner.

The central portion of the revolving frame B, is provided with the right angled post or projection E, which right angled post or projection is for the purpose of journaling one end of the shaft $d'$, and also journaling the central portion of the right and left screw threaded shaft $d^2$; the opposite end of the shaft $d'$, being journaled in one of the parallel bars C, substantially as illustrated in Fig. 4. To the bottom or under sides of the table sections D, are attached the brackets F, which brackets are provided with screw threaded apertures, which screw threaded apertures receive the right and left screw threaded shaft $d^2$. For the purpose of communicating rotary motion to the right and left screw threaded shaft $d^2$, by means of the shaft $d'$, the beveled cog wheels $e$, are provided, and are located substantially as illustrated in Figs. 1, 3, and 4; one of said wheels being securely attached to the shaft $d'$, and the other wheel being securely attached to the right and left screw threaded shaft $d^2$. For the purpose of applying a crank to the outer end of the shaft $d'$, a portion of the outer end of said shaft is formed angular to receive a corresponding shaped aperture formed in the crank $f$.

To the table sections D, are securely attached the tracks or ways F', which tracks or ways are located substantially as shown in Fig. 1; or in other words they are so arranged as to extend toward a common center. One pair or set of the tracks or ways, F', is attached to each section of the table D, thereby providing a pair of tracks or ways. To each track or way F', is journaled a screw threaded shaft such as $g$, and the inner end of each shaft is provided with the beveled wheels $g'$, which beveled wheels are located substantially as shown in Figs. 1, and 2. It will be understood that one of the shafts $g$, should have cut upon its periphery, a right hand screw thread; and the other shaft should have cut upon its periphery a left hand screw thread, thereby causing the corner blocks or heads to travel in the same direction as hereinafter described. It will be understood that as rotary motion is communicated to one of the screw threaded shafts $g$, rotary motion will be communicated to the other screw threaded shaft located upon the same table section D, when said table sections are in the position illustrated in Fig. 1.

Upon the top or upper sides of the tracks or ways $F'$, is located a corner block or head such as G. The corner heads or blocks G, are provided with the pendent arms $h$, which pendent arms are provided with screw threaded apertures $h'$, which screw threaded apertures receive the screw threaded shafts $g$, as illustrated in Fig. 6.

It will be understood that when the table sections D, are separate as illustrated in Fig. 1, the movements of the screw threaded shafts $g$, will be independent of the screw threaded shafts located upon the other table section D. When it is desired to bring all of the screw threaded shafts $g$, into contact with each other by means of the beveled wheels $g'$, the shaft $d'$, is rotated until the table sections D, are brought together by means of the right and left screw threaded shaft $d^2$, as illustrated in Fig. 2; after which all of the screw-threaded shafts $g$, can be rotated at one time, thereby causing all of the corner blocks or heads G, to move to and from a common center in unison. When the sections B are separate as illustrated in Fig. 1, thereby disengaging the two sets of beveled wheels $g'$, from each other, the corner blocks or heads G, will move in unison upon each table section D; or in other words, but two of said corner blocks or heads will move in unison; and each set of corner blocks or heads can be placed at any desired point of adjustment upon their respective sections D.

In use the corner blocks or heads G, are placed in the position to receive the four ends of the picture frame, substantially as illustrated in Fig. 1; it being understood that said corner blocks or heads G, should be extended a short distance past and beyond the extreme corners of the picture frame during the time the different sections of the picture frame are being placed upon the corner blocks or heads G. When the sections forming the picture frame proper are adjusted as illustrated in Fig. 1, a crank such as $f$, is applied to one of the screw threaded shafts $g$, and rotated in such a direction that the corner blocks upon one section of the table D, will travel toward the center, thereby securely clamping the sections of the picture frame together. It will be understood that the crank such as $f$, may be applied to any particular screw threaded shaft $g$, and the same object be accomplished.

For the purpose of preventing the ends of the picture frame from slipping past each other, while being clamped, the corner posts $k$, are provided, which corner posts are located substantially as illustrated in Fig. 1, and as shown, said corner posts are provided with right angled flanges, each flange abutting against its respective section of the picture frame.

For the purpose of assisting in holding the picture frame sections in proper position, the inner portions of the corner blocks or heads G, are each provided with the projections $k'$, which projections are so located and arranged, that their inner faces will abut against the outer edges of the picture frame sections. It will be understood, that by providing the extensions $k$, and $k'$, a sufficient surface of the picture frame sections will be exposed for the purpose of nailing or otherwise attaching the corners together.

For the purpose of bringing the sections forming the picture frame proper into proper alignment, the clamp H, is provided, which clamp is provided with the head $H'$, said head being received in the slot $H^2$, which slot is formed in the corner blocks or heads G. It will be understood that the clamp H, is only to be brought into use in the event one or more of the picture frame sections are sprung or warped. The clamp H is provided with the thumb screw $H^3$, and for the purpose of preventing the bottom or lower end of the thumb screw $H^3$ from marring the picture frame sections, a block such as $H^4$ should be placed between the picture frame sections, and the screw point, as illustrated in Fig. 8.

In the description of my invention, I have described my clamp as being applied to picture frames; but it will be understood that it can be used for the purpose of clamping any rectangular frame such as window sashes, or doors; the size of the clamp being constructed with reference to the size of the frame designed to be clamped. It will be also understood, that various sized frames can be clamped in the same clamp, or machine; but for the purpose of clamping large sized work such as doors and window sashes, it would be best to construct a machine especially adapted for the class of work designed to be clamped.

For the purpose of measuring the distance between the inner edges of the table sections D, the rule I, is provided, which rule may be fixed to one of the table sections D, and extended under the opposite section to the one to which it is attached. The rule I, should be divided into inches and fractions thereof, for the purpose of conveniently adjusting and measuring the space between the table sections D. For the purpose of holding each pair of the tracks or ways $F'$, in proper angular adjustment, the inner ends of said tracks or ways are united together; or in other words, each set of tracks or ways F', is preferably formed of a single piece of metal.

It will be understood that my device can be used in the manufacture of panel work, and especially for the construction where miter corners are used.

Having fully described my invention, what I claim as new, and desire to secure by Letters Patent, is—

1. The combination of the base A, having journaled thereto the frame B, provided with the parallel bars C, the adjustable table sections D, provided with the tracks or ways F', the corner blocks or heads G provided with the slots $H^2$ and the extensions $k$ and $k'$ the screw-threaded shafts $g$ provided with the beveled wheels $g'$, the shaft $d'$, the right and left screw threaded shaft $d^2$, and the beveled wheels $e$, and the clamp H provided with the head H', substantially as and for the purpose set forth.

2. The combination of the base A having journaled thereto the frame B, the bars C, the adjustable sections D mounted upon the frame B, the track or ways F' carrying the corner blocks G, the corner blocks G provided with the slots $H^2$, the extensions $k$ and $k'$, the screw threaded shafts $g$ formed in pairs and located upon opposite sections D and provided upon their inner ends with the wheels $g'$ the shaft $d'$, the right and left screw threaded shaft $d^2$ located below the sections D and provided with the wheel $e$ meshing with a like wheel upon shaft $d'$, and the rule I, and the clamp H provided with the head H', substantially as and for the purpose set forth.

In testimony that I claim the above I have hereunto subscribed my name in the presence of two witnesses.

THOMAS B. BAKER.

Witnesses:
F. W. BOND,
LAURA SHAEFFER.